May 20, 1952 A. F. GREINER 2,597,240
UNIVERSAL JOINT
Filed July 23, 1945

INVENTOR.
ANTON F. GREINER
BY
ATTORNEYS

Patented May 20, 1952

2,597,240

UNITED STATES PATENT OFFICE 2,597,240

UNIVERSAL JOINT

Anton F. Greiner, Detroit, Mich.

Application July 23, 1945, Serial No. 606,491

5 Claims. (Cl. 64—17)

This invention relates generally to torque transmitting universal joints and refers more particularly to improvements in joints of the type comprising a yoke having two pairs of journals. The journals of one pair extend radially outwardly from diametrically opposite sides of the yoke in alignment with one another and are respectively received in bearings carried by a driving member. The journals of the other pair respectively project radially outwardly from opposite sides of the yoke between the journals of the first pair and have a common axis perpendicular to the aligned axes of the first pair of journals. The second pair of journals are respectively received in suitable bearings carried by a driven member. The above construction provides a driving connection between the members which enables torque to be transferred from one member to the other even though the two members are out of alignment.

When universal joints of the above type are installed on road vehicles, they are subjected to extremely hard usage and notwithstanding the precautions taken during manufacture to assure accurate alignment of the bearings, a fairly high percentage of failures of such joints persists. Exhaustive experimental work has shown that failures resulting from undue wear of the joints is caused by the "torque-shock" frequently created when the change speed gears in the variable speed transmission are switched or changed from one speed to another. The shock imparted to the joint is also extremely high when the vehicle is rocked back and forth by engaging the forward and reverse gearing in the transmission in rapid succession. This procedure is common practice in cases where the vehicle becomes stuck in soft ground or sand and is highly destructive to all parts of the driving mechanism.

Regardless of the causes of "torque-shock," it is particularly destructive to universal joints, as it causes such severe deflection of the journals that the needle bearings, ordinarily installed in the bearings in contact with the journals, are subjected to adverse force moments and dig into the journals as deep as $\frac{1}{16}$ of an inch, especially at the radially outer ends of the journals. This condition greatly reduces the effective life of the joint and, in some cases, causes mechanical failures which result in loss of life of the occupants of the vehicle.

One of the principal objects of this invention is to greatly increase the effective life of universal joints and reduce the likelihood of accidents resulting from universal joint failure by relieving the journals and bearings from the major portion of the stress caused by torque shocks. Thus, abnormal deflection of the journals by severe torque shocks is prevented and the tendency for the needles to dig into the journals is reduced to such an extent that its effect on the strength of the journals is negligible.

The foregoing as well as other objects will be made more apparent as this description proceeds, especially when considered in connection with the accompanying drawing, wherein.

Figure 1:
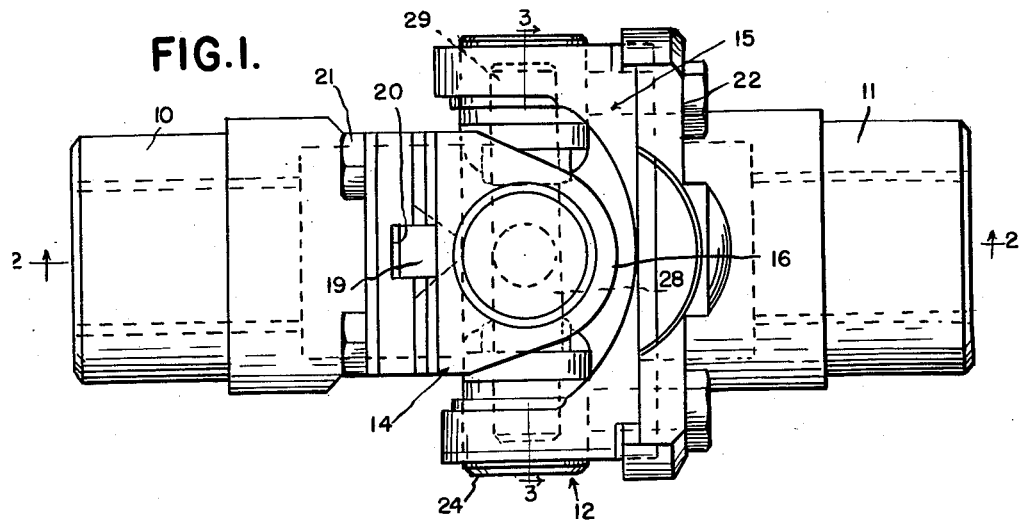
Figure 1 is a side elevation of a torque transmitting device constructed in accordance with this invention.

Referring now more in detail to the drawing, it will be noted that the reference characters 10 and 11 respectively indicate normally aligned, relatively rotatable members having the adjacent ends operatively connected together by means of a universal joint 12. The universal joint selected for the purpose of illustrating the present invention comprises a cross arrangement 13 and a pair of yokes 14 and 15 respectively.

Figure 2:
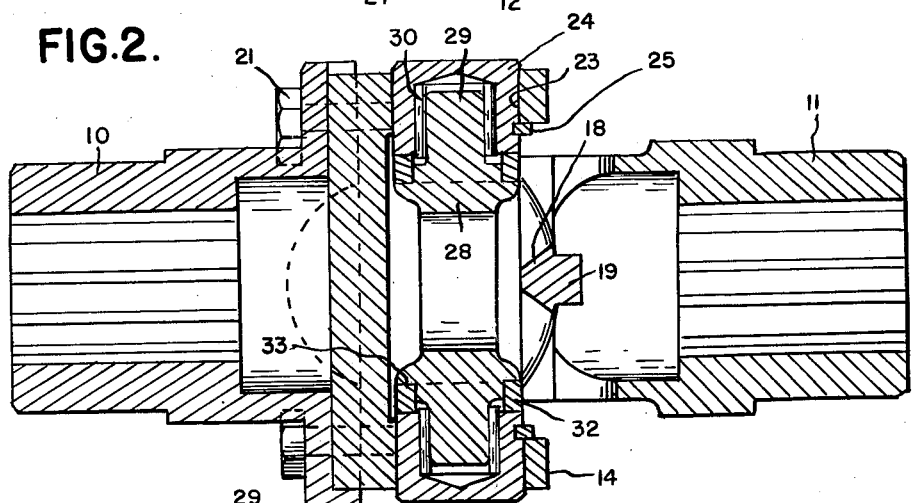
Figure 2 is a longitudinal sectional view taken substantially on the plane indicated by the line 2—2 of Figure 1.
Figure 3:
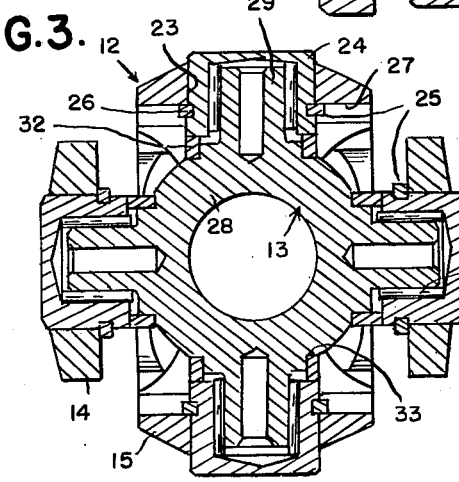
Figure 3 is a cross-sectional view taken substantially on the plane indicated by the line 3—3 of Figure 1.

As shown in Figures 1 to 3 inclusive, each yoke is in the form of a bifurcated member having the furcations 16 integrally connected together by a stiffening rib or backbone 18 and having a spline 19 which extends longitudinally of the rib on the outer surface of the latter. The splines 19 supplement the stiffening action of the ribs 18 and respectively engage in grooves 20 formed in the adjacent ends of the members 11 and 12 respectively. The yoke 14 is detachably secured to the member 10 by studs 21 and the yoke 15 is detachably secured to the member 11 by studs 22. However, the driving torque between the yokes and their respective rotatable members is transmitted through the splines 19, so that the studs are relieved of stresses resulting from torque transmission.

As shown particularly in Figure 1 of the drawing, the yokes are positioned at right angles to each other and the furcations 16 of each yoke are formed with aligned openings 23 of sufficient dimension to receive bearing caps 24. Upon reference to Figure 3 of the drawing, it will be noted that the bearing caps 24 are in the form of inwardly opening cup-shaped retainers and are held in their respective openings 23 against displacement in a radially outward direction by snap rings 25. The snap rings 25 are engaged in annular grooves 26 formed in the outer surfaces of the bearings adjacent the radially inner ends of the latter and abut shoulders 27 formed on the radially inner sides of the furcations 16 on the respective yokes 14 and 15.

The cross member 13 comprises a ring-shaped body portion 28 having two pair of radially outwardly extending journals 29. The journals of each pair are in alignment and the common axis of one pair of journals extends at right angles to the common axis of the other pair of journals. Referring again to Figure 3 of the drawing, it will be noted that the journals of one pair respectively extend into the bearings 24 carried by the yoke 14 and the journals 28 of the other pair respectively project into the bearings 24 carried by the yoke 15. In the present instance, needle type rollers 30 are supported in the bearings 24 for engagement with the journals 29 and provide an anti-friction support for the latter.

From the foregoing, it will be noted that the universal joint operatively connecting adjacent ends of the rotatable members 10 and 11 provides for effective transfer of torque from one member to the other even though a wide angular relationship exists between the two members. It is further pointed out that the backbone or connecting ribs 18, together with the splines 19, serve as a rigid reinforcement between the pairs of bearings and maintains the latter in alignment, even in cases where the universal joint is subjected to abnormal operation. Thus, excessive wear of the bearings, needles and journals is reduced to a minimum and the life, as well as the safety factor, of the universal joint is substantially increased.

While as stated above, the ribs 18 and associated splines 19 coact to maintain the bearings in each pair in alignment throughout operation of the universal joint, nevertheless, under certain extreme conditions, forces are developed in the universal joint tending to deflect the journals 29. Careful analysis of the action of universal joints under practically all conditions of vehicle operation illustrates conclusively that the universal joints are frequently subjected to severe shock by improper shifting of speeds in the associated variable speed transmission. Such tests also illustrated that the severity of the shock to the universal joint was greatly increased when the vehicle was "rocked," or in other words, continuously moved backward and forward in rapid succession as is the usual procedure when attempting to free the vehicle from sand or soft ground. The stresses resulting from severe shocks imparted to the universal joint tend to deflect the journals 29 and to cause the needle-type rollers 30 to dig into the journals sometimes as deep as $\frac{1}{16}$ of an inch, especially at the radially outer ends of the journals. Such a condition, of course, greatly reduces the life of the universal joint and may cause a failure of the joint at a time when the vehicle is operating at a high speed. Failure of the universal joint under such conditions frequently causes the operator to lose control of the vehicle and may result in a serious accident.

In order to overcome the foregoing critical conditions, I provide means in the universal joint for transferring torque shock between the members 10 and 11 without subjecting the journals 29 to sufficient stress to cause abnormal deflection thereof. As shown particularly in Figure 3 of the drawing, the above means comprises a shock transmitting ring 32 concentrically arranged with respect to each journal 29 and seated on an annular shoulder 33 formed on the body portion 28 of the cross member 13. The radially outer surfaces of the rings 32 respectively abut the radially inner ends of the bearings 24. Thus, the rings 32 transfer torque shock from one yoke to the other through the ring-shaped body portion 28 of the cross to the radially inner ends of the bearings 24 and to the yokes through the abutments or snap rings 25. The ring-shaped body portion 28 of the cross possesses more than sufficient strength to withstand the stresses resulting from abnormal torque shock and the snap rings or abutments 25 are positioned in such close proximity to the rings 32 that the tendency for such stresses to deflect the bearings is negligible. Therefore, it may be stated that the journals 29 are bypassed by the stresses resulting from severe torque shocks and deflection of the journals is thereby reduced to the minimum. As a result, the effective life of the universal joint is greatly increased and the likelihood of accidents due to joint failure is reduced to a minimum. In actual tests under extremely severe driving conditions, a universal joint embodying the features of this invention was operated for 75,000 miles without any indication of failure.

Figure 4:
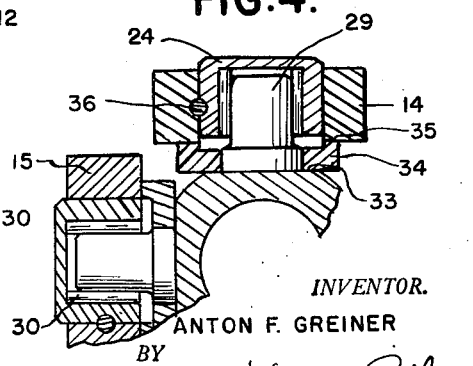
Figure 4 is a fragmentary sectional view of a modified form of universal joint construction.

In Figure 4 of the drawing, I have shown a universal joint similar to the one previously described except that torque shocks are transmitted directly to the yokes 14 and 15 instead of indirectly to the latter through the bearing caps 24, as is the case in the first described form of this invention. As shown in Figure 4 of the drawing, the torque transmitting rings 34 are seated on the shoulders 33 surrounding the journals 29 and are provided with annular seats 35, which abut the under sides of the yokes. The bearing caps 24 are respectively held in the yokes against axial displacement by locking bolts 36 anchored in the yokes and having portions engaging in recesses formed in adjacent sides of the bearing caps.

What I claim as my invention is:

1. In a torque transmitting device, the combination of relatively movable members having radially extending openings therethrough and having shoulders surrounding the openings at the radially inner sides thereof, a torque transmitting element having a generally ring-shaped portion forming a body and having circumferentially spaced journals extending radially outwardly from the body, bearings for the journals respectively sleeved in said openings, abutments on the bearings adjacent the radially inner ends thereof and respectively engageable with the shoulders on the members, and non-yielding shock transmitting rings respectively concentrically arranged with respect to said journals and seated on the body of the torque transmitting element with the radially outer surfaces respectively abutting the radially inner ends of the bearings.

2. In a torque transmitting device, the combination of relatively movable members having radially extending openings therethrough and having shoulders surrounding the openings at the radially inner sides thereof, a torque transmitting element having a body and having circumferentially spaced journals extending radially outwardly from the body, bearings for the journals respectively located in the openings formed in said members, and non-yielding shock transmitting rings respectively concentrically arranged with respect to said journals and seated on the body of the torque transmitting member with the radially outer surfaces respectively abutting the radially inner ends of the bearings.

3. In a torque transmitting device, the combination with relatively movable members of a torque transmitting element having a body and having circumferentially spaced journals extending radially outwardly from the body, bearings for the journals respectively sleeved in openings provided in said members, and non-yielding shock transmitting rings respectively concentrically arranged with respect to the journals and seated on shoulders formed on the body at the radially inner ends of the journals with the radially outer surfaces respectively abutting the radially inner ends of the bearings.

4. In a torque transmitting device, the combination of relatively movable bifurcated members each having aligned openings in the furcations thereof, a cross member engageable between the furcations and having radially outwardly extending journals respectively projecting into the openings, bearings for the journals respectively sleeved in the openings and carrying abutments respectively engageable with the radially inner surfaces of the furcations, and non-yielding shock transmitting rings respectively concentrically arranged with respect to the journals and seated on the body of the cross at the radially inner ends of the journals with the radially outer surfaces respectively abutting the radially inner ends of the bearings.

5. In a torque transmitting device, the combination of relatively movable members having radially extending openings therethrough and having shoulders surrounding the opening at the radially inner sides thereof, a torque transmitting element having a body and having circumferentially spaced journals extending radially outwardly from the body, bearings for the journals respectively located in the openings formed in said members, snap rings respectively engageable in annular grooves formed in the bearings adjacent the radially inner ends of the latter and engageable with the shoulders on said members, and non-yielding shock transmitting rings respectively concentrically arranged with respect to the journals and seated on the body at the radially inner ends of the journals with the radially outer surfaces respectively abutting the radially inner ends of the bearings.

ANTON F. GREINER.

REFERENCES CITED

The following references are of record in the file of this patent:

UNITED STATES PATENTS

| Number | Name | Date |
|---|---|---|
| 1,186,134 | Ross | June 6, 1916 |
| 2,025,502 | Fageol | Dec. 24, 1935 |
| 2,114,199 | Wollner | Apr. 12, 1938 |
| 2,244,380 | Warner | June 3, 1941 |
| 2,397,585 | Anderson | Apr. 2, 1946 |